United States Patent [19]

Kobayashi

[11] Patent Number: 5,113,658
[45] Date of Patent: May 19, 1992

[54] HYDRAULIC ASSIST TURBOCHARGER SYSTEM

[75] Inventor: Robert J. Kobayashi, Rancho Palos Verdes, Calif.

[73] Assignee: Allied-Signal, Inc., Morris County, N.J.

[21] Appl. No.: 525,967

[22] Filed: May 21, 1990

[51] Int. Cl.$^5$ .............................................. F02B 37/10
[52] U.S. Cl. ......................................... 60/608; 60/612
[58] Field of Search ........................ 60/607, 608, 612

[56] References Cited

U.S. PATENT DOCUMENTS

| | | | |
|---|---|---|---|
| 4,285,200 | 8/1981 | Byrne et al. | 60/607 |
| 4,322,949 | 4/1982 | Byrne et al. | 60/606 |
| 4,444,014 | 4/1984 | Kobayashi et al. | 60/608 |
| 4,478,043 | 10/1984 | Kobayashi et al. | 60/608 |
| 4,622,817 | 11/1986 | Kobayashi | 60/608 |
| 4,969,332 | 11/1990 | Nancarrow | 60/608 |

FOREIGN PATENT DOCUMENTS

10114  1/1983  Japan ..................... 60/608

Primary Examiner—Leonard E. Smith
Attorney, Agent, or Firm—Kelly, Bauersfeld & Lowry

[57] ABSTRACT

An improved hydraulic assist turbocharger system is provided for supplying charge air to a combustion engine. The system includes at least one turbocharger having an hydraulic assist turbine adapted to be driven by a pressurized hydraulic fluid to supplementally drive the turbocharger during selected engine operating conditions when supplemental charge air flow is required. Hydraulic fluid flow is regulated by an electrohydraulic control valve responsive to control signals from a main controller, wherein the control signals and corresponding control valve operation may be independent of engine speed and load. In addition, the hydraulic fluid is supplied to the hydraulic assist turbine via a dual segment nozzle, with appropriate selector valves coupling the fluid for passage through one or both nozzle segments in accordance with engine charge air requirements. The entire system, inclusive of the turbocharger and related control components, is conveniently provided as a unitary package adapted for facilitated mounting onto a combustion engine.

22 Claims, 7 Drawing Sheets

HYDRAULIC ASSIST TURBOCHARGER SYSTEM

BACKGROUND OF THE INVENTION

This invention relates generally to turbocharger systems for use with combustion engines. More specifically, this invention relates to an improved hydraulic assist turbocharger system and related control arrangement for use in controlling the operation of an hydraulic assist turbocharger, such as that described in U.S. Pat. Nos. 4,285,200 and 4,444,014.

Turbochargers and turbocharger systems are generally known in the art for supplying a combustion engine with a charge of air under pressure, commonly referred to as charge air. The turbocharger typically comprises a turbine wheel and a compressor wheel mounted for rotation with a common shaft. The turbine wheel and the compressor wheel are positioned respectively within turbine and compressor housings, which are mounted in turn at the opposite ends of a so-called center housing including appropriate shaft bearings for supporting the rotating shaft. Exhaust gases from a combustion engine are coupled for passage through the turbine housing to rotatably drive the turbine wheel, whereby the rotating turbine wheel correspondingly drives the compressor wheel to draw in and compress ambient air for supply as charge air to the intake manifold of the combustion engine.

Turbocharged engines are highly advantageous when compared with conventional naturally-aspirated engines in that substantially denser air is delivered to the combustion chamber or cylinders of the engine. This increased air density results in an increased mass flow of available air for combustion, thereby permitting the engine to operate at substantially higher performance levels and/or with greater efficiency However, an inherent limitation with turbochargers has been their inability to provide the engine with sufficient charge air during some conditions of engine operation. For example, charge air supplied to the engine by the turbocharger during low speed operating conditions is typically insufficient to permit engine operation at a relatively high load and/or to permit relatively rapid engine acceleration. Moreover, in a two-cycle engine, charge air supplied by the turbocharger during starting and/or other low speed operating conditions is normally insufficient to keep the engine from stalling.

A variety of system concepts are known in the art for boosting or supplementing the normal charge air output of a turbocharger during selected engine operating conditions. For example, auxiliary combustion systems have been proposed to supplement the energy level of the engine exhaust gases during selected engine operating conditions. Compound turbocharger systems have also been proposed wherein multiple turbine and/or compressor components are interconnected to provide supplemental charge air. Additional system concepts include, for example, mechanical drive trains for mechanically supplementing turbocharger rotation, and hydraulic drive systems for hydraulically supplementing turbocharger rotation.

One system concept of particular note is described in detail in U.S. Pat. No. 4,285,200 and comprises a specific hydraulic drive arrangement in the form of a so-called three-wheeled turbocharger. In this system, a nonventilated hydraulic turbine is carried on a turbocharger shaft between the turbine and compressor wheels, and this nonventilated hydraulic turbine is supplied with hydraulic fluid under pressure to supplementally drive the turbocharger. In this manner, the mass flow output of charge air for supply to the engine is significantly increased during selected operating conditions. However, successful operation of this type of hydraulic drive system is predicated upon provision of an efficient control arrangement for rapidly supplying the hydraulic turbine with a regulated flow of pressurized hydraulic fluid in accordance with an engine air flow requirement schedule. Moreover, it is highly desirable for the control arrangement to unload hydraulic pumping elements when the need for supplemental driving is reduced or not required, such that parasitic hydraulic power losses can be minimized.

An improved hydraulic drive arrangement for a three-wheeled turbocharger is described in U.S. Pat. Nos. 4,444,014 and 4,478,043. In this improved system, hydropneumatic control valve components are provided to regulate flow of hydraulic fluid to an hydraulic assist turbine in a turbocharger. This hydropneumatic control scheme responds to engine speed and load parameters to unload the hydraulic pumping elements in a progressive manner, when pumping capacity otherwise exceeds the need for supplemental driving of the turbocharger. However, this type of control arrangement lacks the flexibility and broad control range required to provide adequate supplemental driving of the turbocharger during some conditions of operation, particularly such as low speed and/or starting conditions wherein supplemental driving requirements may be independent of engine speed and load.

The present invention provides an improved hydraulic assist turbocharger system having control components adapted to provide a regulated or scheduled flow of pressurized hydraulic fluid to the hydraulic turbine of a three-wheel turbocharger, wherein this fluid flow is controlled in response to engine air requirements which may be substantially independent of engine speed and load parameters.

SUMMARY OF THE INVENTION

In accordance with the invention, an improved hydraulic assist turbocharger system includes a control arrangement for scheduling the flow of pressurized hydraulic fluid to an hydraulic assist turbocharger to supplementally drive the turbocharger to supply charge air to a combustion engine, wherein the flow of pressurized hydraulic fluid may be substantially independent of engine speed and load. The control arrangement includes an electrohydraulic control valve responsive to control signals from a main controller to provide substantial supplemental turbocharger driving during selected engine operating conditions, and to unload hydraulic pumping elements during other operating conditions.

The hydraulic assist turbocharger includes a turbine wheel and a compressor wheel mounted on a common shaft and respectively received within turbine and compressor housings. Exhaust gases from the combustion engine drive the turbine wheel which correspondingly drives the compressor wheel to supply relatively high density charge air to the engine. An hydraulic turbine is mounted on the turbocharger shaft within a so-called center housing disposed between the turbine and compressor housings. This hydraulic turbine is adapted to be driven by the pressurized hydraulic fluid, such as oil, to supplementally drive the turbocharger during selected engine operating conditions and thereby provide supplemental charge air to the engine. The hydraulic fluid is supplied to the center housing by one or more pump elements driven by the combustion engine.

In accordance with one primary aspect of the invention, the flow and pressure of the hydraulic fluid is regulated by the electrohydraulic control valve in response to control signals from the main controller. The electrohydraulic control valve includes means for progressively unloading or relieving a portion of the presurized hydraulic fluid, wherein the control valve is modulated in accordance with a schedule of selected engine operating conditions. In the preferred form, the main controller receives and monitors data representative of a range of engine operating conditions, and then responds in a preprogrammed manner to specifically set the position of the electrohydraulic control valve to obtain the desired level of supplemental turbocharger driving. While the monitored engine parameters may include speed and load, the control signals generated by the controller may be substantially independent of engine speed and load during certain selected conditions of operation.

The pressurized hydraulic fluid is coupled for flow through primary and secondary conduits to a nozzle mounted within the center housing of the turbocharger. The nozzle directs the pressurized fluid through a plurality of nozzle orifices to produce high energy fluid jets which are directed into driving association with the hydraulic assist turbine. In the preferred form, the nozzle includes a pair of nozzle segments each having one or more nozzle orifices and coupled respectively to the primary and secondary conduits. With this arrangement, the secondary conduit can be closed during selected conditions, such as during a starting mode, to couple the entire flow of hydraulic fluid for passage at relatively increased pressure through the primary conduit. As a result, during a starting mode, the hydraulic fluid is passed through a smaller number of nozzle orifices such that the relative driving energy of the hydraulic fluid is increased to yield substantial supplemental turbocharger driving and substantial generation of charge air flow. This arrangement is particularly suited for use with two-cycle engines to permit starting and low speed operation without the use of a conventional scavenge blower.

The improved hydraulic assist turbocharger system is provided as a substantially unitary package, with one or more three-wheel turbochargers and related control components being mounted on a common pedestal or frame. In this configuration, the system can be installed quickly and easily onto a combustion engine to supply supplemental charge air when desired.

Other features and advantages of the present invention will become more apparent from the following detail description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
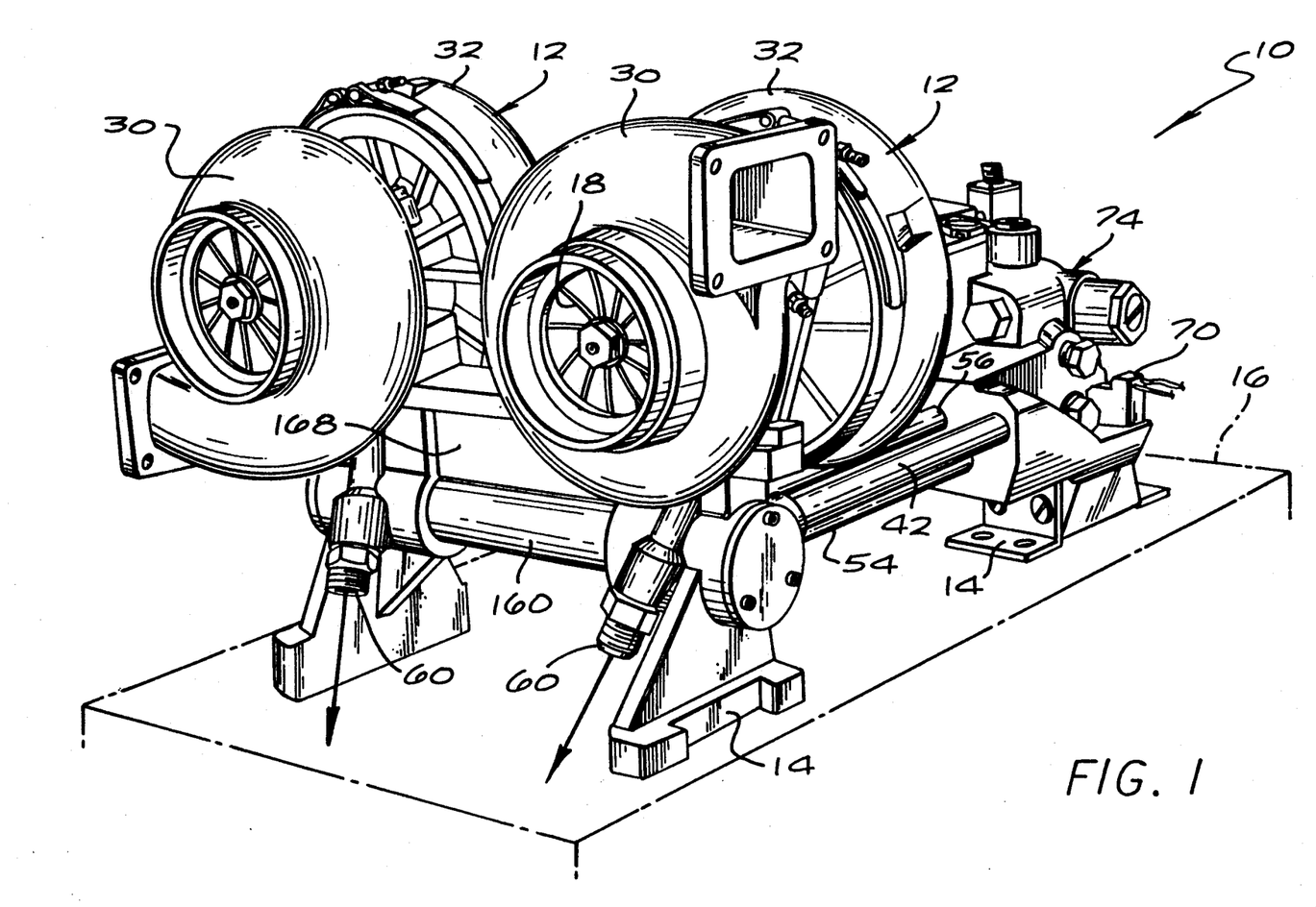
FIG. 1 is a front end perspective view of an hydraulic assist turbocharger system embodying the novel features of the invention, and including twin turbochargers and associated control components mounted on a common support frame.
Figure 2:
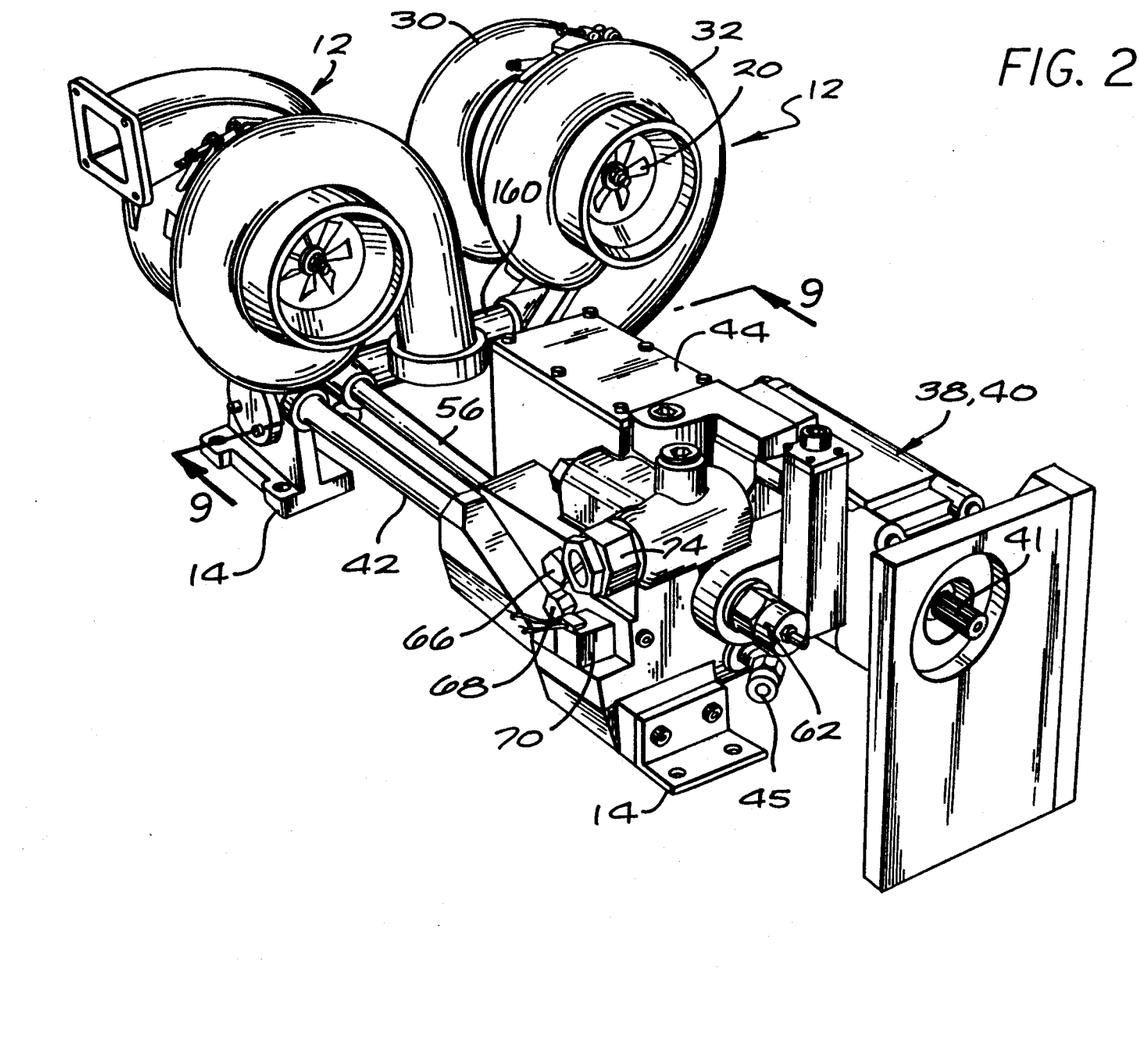
FIG. 2 is an aft end perspective view of the hydraulic assist turbocharger system of FIG. 1.

As shown in the exemplary drawings, an improved hydraulic assist turbocharger system referred to generally by the reference numeral 10 is provided for supplying relatively high density charge air to a combustion engine. The turbocharger system 10 is shown in FIGS. 1 and 2 to include a pair of turbochargers 12 mounted with appropriate control components as a substantially unitary package on a common pedestal or support frame 14 which is adapted in turn for facilitated mounting onto a combustion engine 16. The control components, as will be described in more detail, regulate the supply of a pressurized hydraulic fluid to the turbochargers 12 to supplementally drive the turbochargers when supplemental charge air is required by the engine 16. In accordance with one primary aspect of the invention, the supply of hydraulic fluid and the resultant generation of charge air may be regulated substantially independent of engine speed and load.

The turbochargers 12 depicted in FIGS. 1 and each comprise an hydraulic assist or so-called three-wheel turbocharger of the general type shown and described in U.S. Pat. Nos. 4,285,200; 4,444,014; and 4,478,043, which are incorporated by reference herein. That is, the turbochargers 12 are designed for conventional operation individually or in tandem to utilize energy in exhaust gases expelled from the engine to compress ambient air for supply as so-called charge air to an engine intake manifold. Each turbocharger further includes an hydraulic assist turbine (not shown in FIGS. 1 and 2), wherein the hydraulic assist turbine is adapted to be driven by a pressurized hydraulic fluid such as oil to supplement or increase the charge air output. As described in the above-referenced patents, supplemental charge air may be required or desired during certain engine operating conditions, such as starting, low speed operation, etc.

Figure 4:
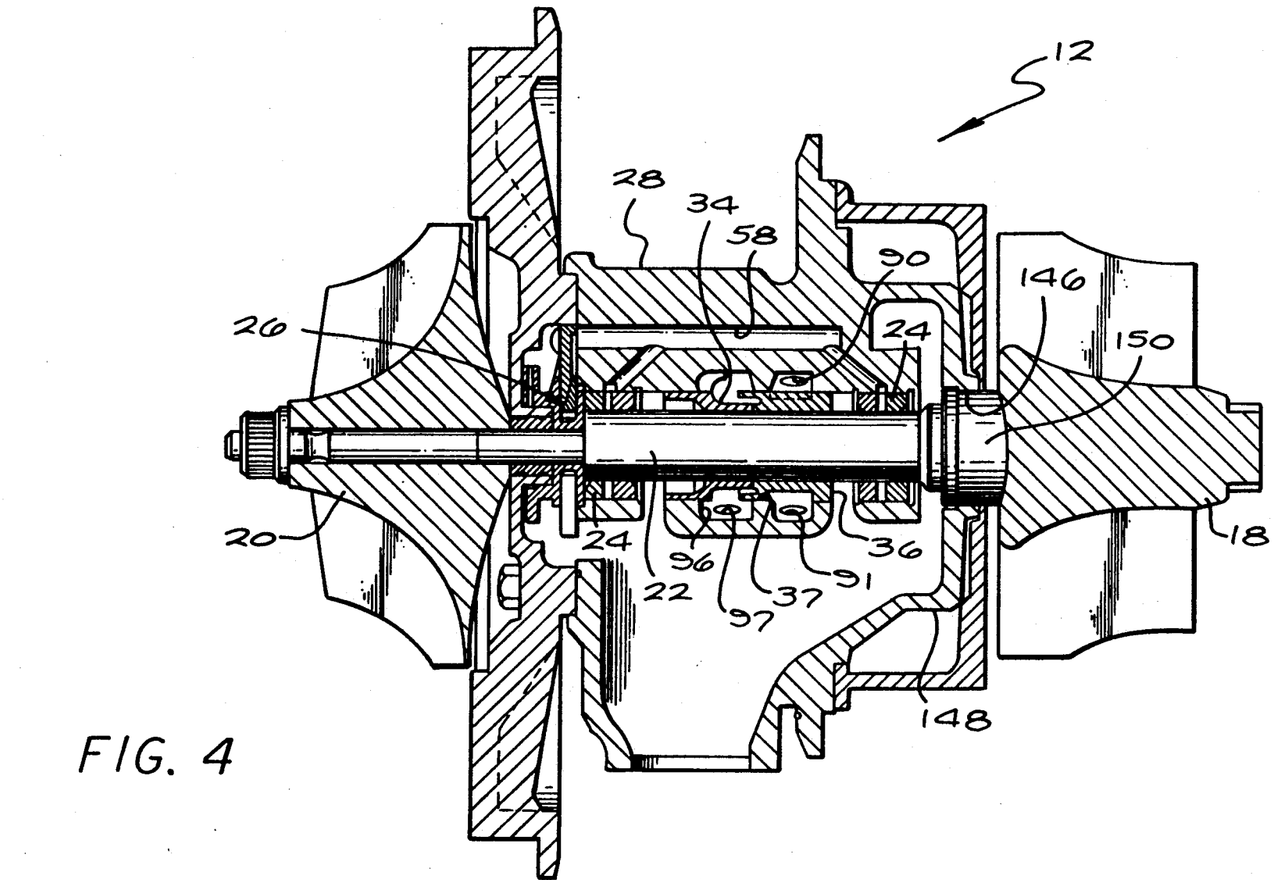
FIG. 4 is an enlarged fragmented vertical section of a so-called three-wheel turbocharger having a non-ventilated hydraulic assist turbine.

More specifically, with primary reference to FIG. 4, each of the turbochargers 12 includes a turbine wheel 18 and a compressor wheel 20 connected to the opposite ends of a common turbocharger shaft 22. The shaft 22 is rotatably supported by a pair of journal bearings 24 and an associated thrust bearing unit 26 within a so-called center housing 28. The turbine and compressor wheels 18 and 20 are positioned respectively within turbine and compressor housings 30 and 32 (FIGS. 1 and 2) which are mounted onto the center housing 28 in a conventional manner. Exhaust gases discharged from the combustion engine are passed through the turbine housing 30 to rotatably drive the turbine wheel 18, and thereby correspondingly drive the compressor wheel 20 within the compressor housing 32. Such rotation of the compressor wheel draws ambient air into the compressor housing for compression and supply as so-called boost or charge air to the engine. Appropriate conduit connections between each turbocharger 12 and the engine 16 are well known in the art and thus have been omitted from FIGS. 1 and 2.

Each of the turbochargers 12 further includes an hydraulic assist turbine 34 mounted on the shaft 22 within the center housing 28, preferably at a position disposed centrally between the journal bearings 24. The hydraulic assist turbine 34 is positioned adjacent to a nozzle 36 through which pressurized hydraulic fluid is supplied as high energy jets for rotatably driving the hydraulic turbine 34. The hydraulic turbine 34 is secured onto the turbocharger shaft 22 for rotation therewith, such that rotational driving of the hydraulic turbine provides an alternative or supplemental means for rotatably driving the turbocharger shaft. Accordingly, appropriate supply of the pressurized hydraulic fluid into driving relation with the hydraulic turbine 34 enables the turbocharger 12 to supply charge air to the engine at a mass flow exceeding normal turbocharger performance attributable to the driving energy of engine exhaust gases. As one example, the turbocharger can be hydraulically driven to supply compressed charge air to the engine during a start mode, when exhaust gases are not available, or during certain low speed or low load modes when the exhaust gas flow is inadequate to provide a desired charge air inflow to the engine.

Figure 3:
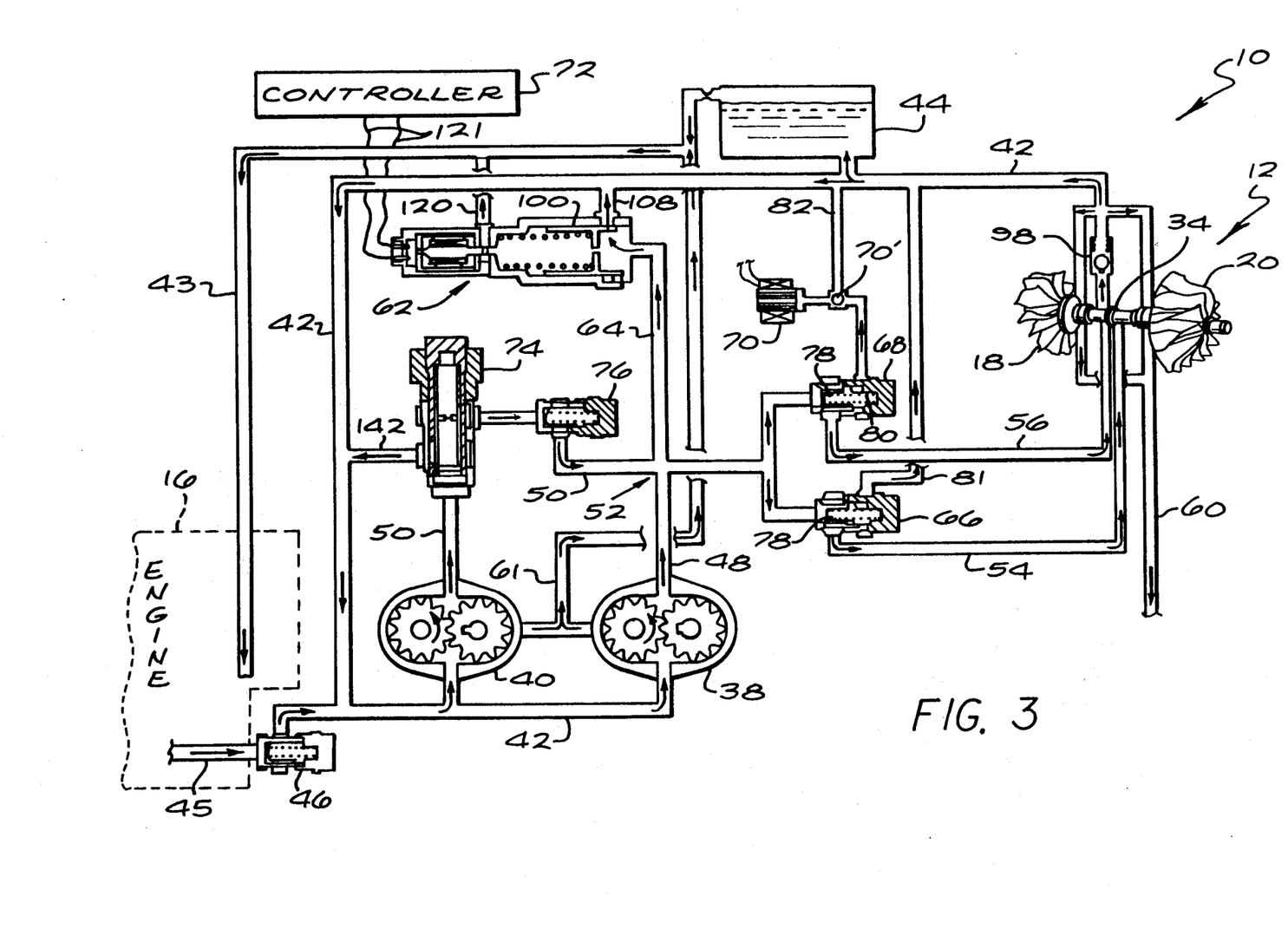
FIG. 3 is a schematic diagram illustrating the hydraulic assist turbocharger system and related control components in connection with a single turbocharger.

The preferred control arrangement of the present invention is shown schematically in FIG. 3 in relation to one of the turbochargers 12. In general terms, this control arrangement utilizes a pair of positive displacement pumping elements such as gear pumps 38 and 40 which are suitably driven by the combustion engine 16 to generate parallel flow outputs of pressurized hydraulic fluid. In this regard, in the preferred form, the gear pumps 38 and 40 comprise dual elements of a common gear pump having a drive shaft 41 (FIG. 2) adapted to be driven by appropriate connection to the engine crankshaft (not shown). Hydraulic fluid is supplied to inlets of the gear pumps 38 and 40 via a conduit 42 coupled to a small sump reservoir 44. The preferred hydraulic fluid comprises engine oil shared with a conventional engine lubrication system, with portions of the engine oil being recycled to the engine through a return conduit 43 and resupplied to the turbocharger system 10 via a make-up conduit 45 connected through a check valve 46 to the pump inlet conduit 42.

The dual gear pumps 38 and 40 provide the parallel output flows of hydraulic fluid through a respective pair of discharge conduits 48 and 50, as shown in FIG. 3, to a common summing junction 52. In general terms, at the summing junction 52, the hydraulic flows are combined for supplying through parallel primary and secondary conduits 54 and 56 to the hydraulic turbine 34 within the turbocharger 12. As noted previously, the hydraulic fluid is directed by the nozzle 36 (FIG. 4) into driving relation with the hydraulic turbine 34 to supplementally rotate the turbocharger shaft 22 and thereby supplement the charge air output produced by the turbocharger. A portion of the hydraulic fluid supplied to the turbocharger 12 is also directed through appropriate passages 58 (FIG. 4) in the center housing 28 to provide lubrication for the turbocharger shaft bearings, with lubricant being recirculated via a bearing drain conduit 60 (FIG. 3) to the sump or alternately to the engine 16. Similarly, a portion of the hydraulic fluid supplied to the gear pumps 38 and 40 may be used to lubricate the pump components, followed by recirculation through a drain conduit 61 to the sump 44 or the engine 16.

The specific flow of hydraulic fluid supplied to the turbocharger 12 through the primary and secondary conduits 54 and 56 is closely regulated by a plurality of control valve components for purposes of obtaining close control over supplemental turbocharger driving. More particularly, an electrohydraulic control valve 62 is connected along a relief conduit 64 to modulate relief flow of a selected portion of the hydraulic fluid flow from the summing junction 52 to the recirculation conduit 42. Similarly, a pair of selector valves 66 and 68 are mounted respectively along the primary and secondary conduits 54 and 56 to control flow of hydraulic fluid through those conduits, with the selector valve 68 being subject to closure in response to operation of a solenoid unit 70 such that the entire hydraulic fluid flow passes to the turbocharger through the primary conduit 54. The electrohydraulic control valve 62 and the solenoid unit 70 are adapted for operation in response to command signals from a main controller 72, as will be described in more detail. In addition, a flow bypass valve 74 and related check valve 76 are mounted along the discharge conduit 50 associated with the gear pump 40. These control components 74 and 76 are designed for pressure or flow responsive operation to unload the pump 40 during selected engine operating conditions, although it will be understood that such components may be adapted for electronic control by means of the main controller 72, if desired.

During certain engine operating conditions, it is desirable to supply the turbocharger 12 with the entire hydraulic outflow produced by the gear pumps 38 and 40. During such operation, the flow bypass valve 74 and the associated check valve 76 (both of which will be described in more detail) permit the outflow from the pump 40 to combine with the outflow from the pump 38 at the summing junction 52. The electrohydraulic control valve 62 (to be described in more detail) prevents relief flow of the fluid through the relief conduit 64 such that the combined fluid flow divides proportionately for parallel flow through the primary and secondary conduits 54 and 56 to the turbocharger. In this regard, the selector valves 66 and 68 include movable valve members 78 biased by springs 80 toward normally closed positions, wherein the valve members 78 are adapted to retract toward open positions in response to pressure at the summing junction 52. Both selector valves are of a conventional vented style wherein the remote sides of the valve members 78 are normally connected to a low pressure site such as by means of respective vent lines 81 and 82 connected to the recirculation conduit 42. Accordingly, a small flow of the hydraulic fluid which tends to leak past each valve member 78 is recovered and returned to the oil system via the vent lines.

Figures 5, 6:
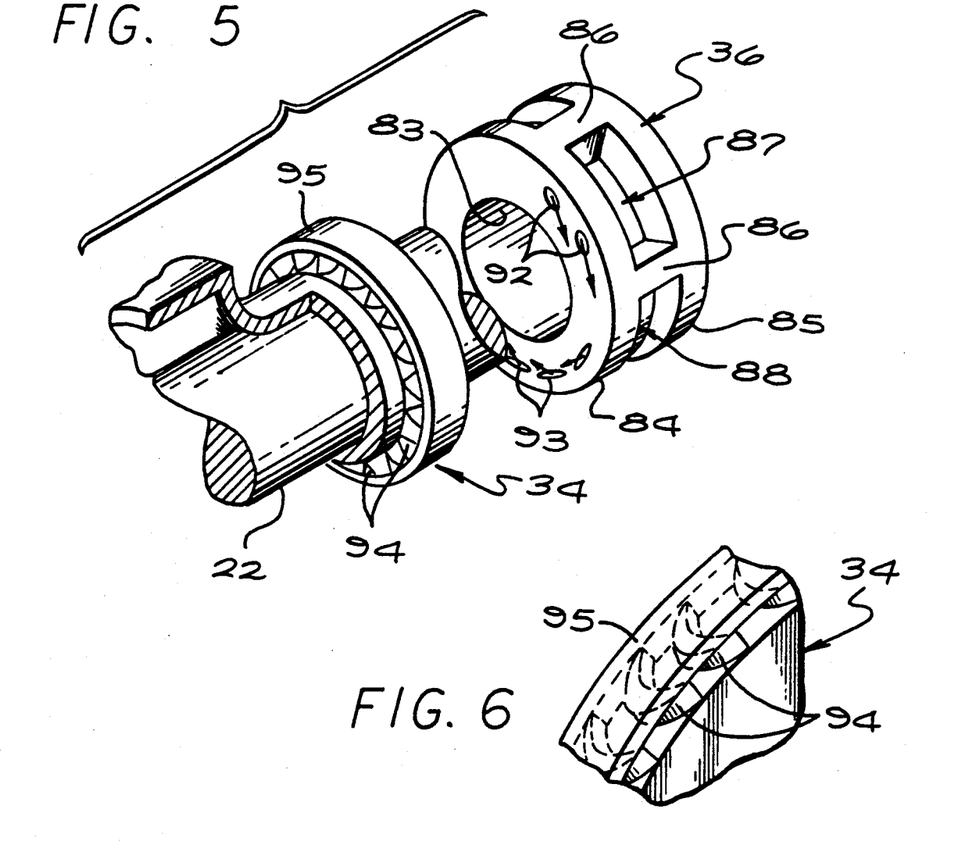
FIG. 5 is an enlarged and exploded perspective view illustrating the hydraulic assist turbine in association with a dual segment nozzle.
FIG. 6 is an enlarged fragmented perspective view of a portion of the hydraulic assist turbine.

Hydraulic fluid passing through the primary and secondary conduits 54 and 56 enters the turbocharger center housing 28 (FIG. 4) for further flow through separate internal passages in the center housing into communication with the nozzle 36. In this regard, as shown in FIGS. 4 and 5, the preferred nozzle 36 comprises a cylindrical member having a size and shape for convenient installation into a prepared nozzle bore 37 by press fitting or the like. An inner cylindrical sleeve 83 (FIG. 5) of the nozzle 36 is sized for close running clearance about the turbocharger shaft 22. A pair of annular flanges 84 and 85 radiate outwardly from the inner sleeve 83 and terminate with an outer diameter for press fit mounting into the nozzle bore 37. These flanges 84 and 85 are spaced axially from each other to define an annular radially outwardly open cavity therebetween. A pair of short axial walls 86 bridge between the annular flanges 84 and 85 to separate this interflange cavity into two distinct arcuate segments 87 and 88. As viewed in FIG. 5, the axial walls 86 are circumferentially spaced from each other by a distance significantly less than 180°, such that the segment 87 is significantly smaller than the segment 88.

The hydraulic flow through the primary conduit 54 is coupled via a port 90 (FIG. 4) in the center housing 28 for passage into the nozzle segment 87. Similarly, hydraulic flow through the secondary conduit 56 is connected via a port 91 for passage into the nozzle segment 88. From these nozzle segments 87 and 88, the hydraulic flow passes through respective sets of nozzle orifices 92 and 93 formed in the flange 84 disposed adjacent to the hydraulic turbine 34. These sets of nozzle orifices 92 and 93 are angularly oriented relative to the axis of the shaft 22 such that the hydraulic fluid discharges through the orifices as small jets having a significant circumferential component of direction. The different arcuate sizes of the nozzle segments 87 and 88 facilitates use of different numbers of orifices for the nozzle sets 92 and 93, with one preferred embodiment of the invention utilizing two orifices 92 associated with the smaller nozzle segment 87 and five orifices 93 associated with the larger nozzle segment 88.

The hydraulic turbine 34 is mounted on the turbocharger shaft 22 for rotation with the shaft, as by press fit mounting or the like. As shown in FIGS. 4-6, the hydraulic turbine 34 comprises a nonventilated turbine having an array of cupped vanes 94 within a circumferential shroud 95. The vanes 94 are directionally oriented to be driven by the hydraulic fluid jets from the nozzle orifices 92 and 93 to rotatably drive the turbocharger shaft 22. As viewed in FIG. 4, the hydraulic turbine 34 is adapted to operate fully submerged within a center housing chamber 96, and an outlet port 97 permits oil recirculation flow from the chamber 96 to the recirculation conduit 42 (FIG. 3). A check valve 98 (FIG. 3) is conveniently provided at a suitable location between the chamber 96 and the conduit 42 to prevent reverse flow to the chamber 96 during operating conditions when hydraulic fluid is not supplied to the hydraulic turbine 34.

At this point, it will be recognized that the volumetric output of the gear pumps 38 and 40 will be a direct correlation to engine speed, since the positive displacement elements are driven from the engine crankshaft. Accordingly, the hydraulic output flow and its corresponding fluid pressure will vary widely as a function of engine speed. During some conditions of engine operation, it will be necessary to provide the entire combined hydraulic flow to the turbocharger (as previously described) to achieve the desired level of charge air delivery to the engine. However, during other engine operating conditions, it will be necessary to relieve part or all of the hydraulic flow to reduce or eliminate charge air supplementation. Moreover, especially during engine starting or other low speed conditions, it is desirable to boost the driving interaction between the hydraulic fluid and the hydraulic turbine.

More particularly, when the engine is not operating, the gear pumps 38 and 40 are also nonoperational and the hydraulic fluid output is zero. During a start mode, a conventional starter motor (not shown) or the like is used to crank the engine at relatively low speed to achieve initial ignition and acceleration to a set idle speed. During engine cranking, the gear pumps 38 and 40 are rotatably driven to provide hydraulic fluid outputs to the summing junction 52. In this mode, the bypass valve 74 and the electrohydraulic control valve 62 do not relieve any portion of the flow from the summing junction. Accordingly, the entire fluid flow is supplied to the primary and secondary conduits 54 and 56. However, during the start mode, the main controller 72 signals the solenoid unit 70 to set a valve member 70' to close the vent line 82 associated with the selector valve 68 along the secondary conduit 56. Such closure of the vent line 82 results in a rapid pressure rise at the remote side of the associated valve member 78 to shift and hold the valve member in a position closing the secondary conduit 56. As a result, the entire combined hydraulic output produced by the gear pumps 38 and 40 is forced to flow through the primary conduit 54 to the nozzle 36 for driving communication with the hydraulic turbine 34 via the limited number of nozzle orifices 92. The hydraulic fluid is thus directed into driving relation with the hydraulic turbine 34 at an increased or boosted pressure to obtain substantial turbocharger driving notwithstanding the relatively low cranking speed of engine operation.

As soon as the engine is started and appropriately accelerated to an acceptable idle speed, typically on the order of 500-600 r.p.m., the main controller 72 (FIG. 3) may be programmed to signal the solenoid unit 70 to open the associated vent line 82. When this occurs, the selector valve 68 reopens to permit hydraulic fluid flow to the hydraulic turbine 34 via the secondary conduit 56. Such flow passes into the larger chamber segment 88 of the nozzle 36 and further through the nozzle orifices 93 into driving communication with the turbine 34. As a result, the hydraulic fluid flows proportionately through both nozzle segments 87 and 88 and correspondingly jets through all of the orifices 92 and 93 into driving association with the hydraulic turbine 34, but with substantially reduced power transfer in comparison with the starting mode.

During normal engine operation throughout a range of different speed and load conditions, the specific level of supplemental driving of the turbocharger 12 is regulated by the electrohydraulic control valve 62. In general terms, when little or no supplemental driving of the turbocharger is needed, the control valve 62 is set by the main controller 72 to relieve the gear pump outputs directly to the recirculation conduit 42. Alternately, whenever supplemental driving is required, the control valve 62 is modulated to proportionately adjust between fully open and fully closed positions.

Figure 7:
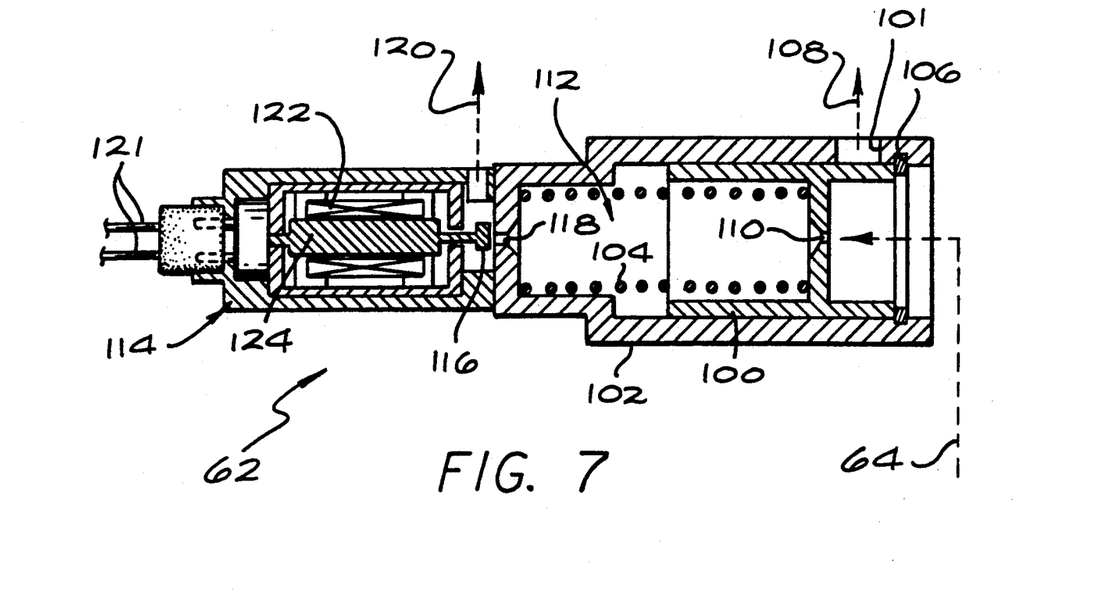
FIG. 7 is a somewhat schematic sectional view depicting an electrohydraulic control valve for use in regulating flow of pressurized hydraulic fluid.

The electrohydraulic control valve 62 is shown in FIG. 7 in one preferred form. As shown, the control valve 62 includes a valve sleeve 100 disposed within a cylindrical valve body 102. A biasing spring 104 reacts between the valve body 102 and the valve sleeve 100 to urge the valve sleeve normally against a fixed stop 106. In this normal position, the valve sleeve 100 blocks fluid flow from the relief conduit 64 to an outlet line 108 leading to the recirculation conduit 42.

A bleed port 110 is formed in an end wall of the valve sleeve 100 to bleed a small portion of the hydraulic fluid within the relief conduit 64 into a control chamber 112 within the valve body 102. The specific fluid pressure within the control chamber 112 is appropriately modulated by a valve pilot stage 114 having a pilot head 116 movably positioned with respect to a control orifice 118 opening into the control chamber. In particular, the pilot head 116 is movable between an advanced position substantially closing the control orifice 118 to cause fluid pressure build-up within the control chamber, and a retracted position spaced from the control orifice 118 by a selected increment to achieve a selected lower pressure level within the control chamber 112. Fluid bleeding through the open or partially open control orifice 118 is directed through an outlet 120 to the return conduit 43.

Control signals from the main controller 72 are connected via conductors 121 to a control coil 122 within the pilot stage 114 to modulate the specific axial position of an armature 124 having the pilot head 116 mounted thereon. Accordingly, the main controller 72 specifically regulates pilot head position to regulate the control chamber pressure and the corresponding position of the valve sleeve 100 relative to a relief port 101. The degree to which the relief port 101 is uncovered by the valve sleeve 100 controls the degree to which the hydraulic fluid is relieved from the summing junction 52.

As engine speed increases during normal operation, the volumetric output flow of the gear pumps 38 and 40 correspondingly increases. Concurrently, the mass flow output of exhaust gases expelled from the engine also increases, such that there exists substantial turbocharger drive capability to accommodate transient requirements for charge air. Accordingly, the high volume output of hydraulic fluid from the gear pumps 38 and 40 reaches a point whereat the supplemental drive capacity provided by the hydraulic fluid effectively provides excess turbocharger drive capability. To minimize parasitic power losses during such conditions, the gear pump 40 is unloaded by means of the flow bypass valve 74.

Figure 8:
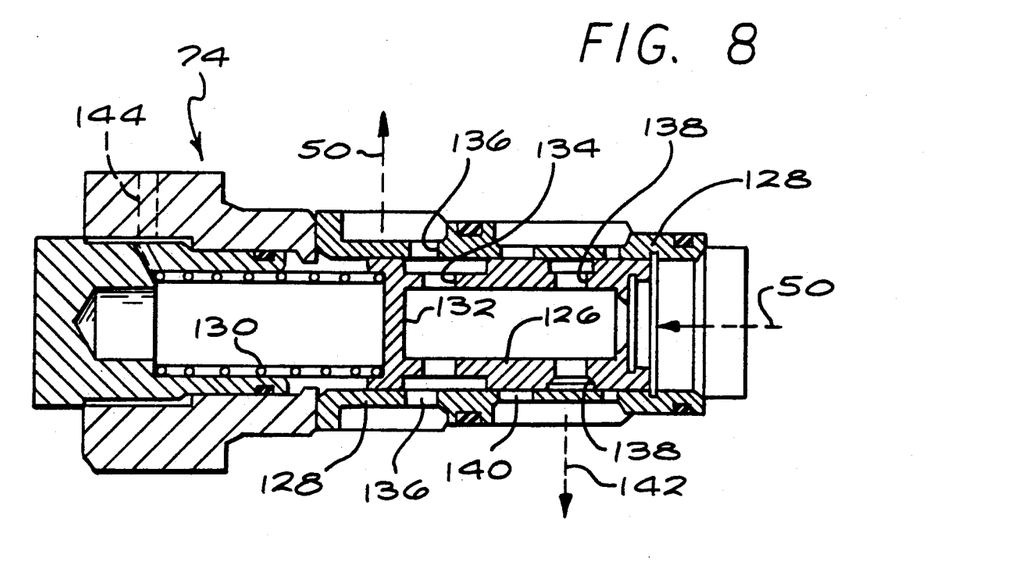
FIG. 8 is a somewhat schematic sectional view depicting a flow bypass valve for unloading a portion of the hydraulic fluid flow during certain engine operating conditions.

More particularly, as shown in one preferred form in FIGS. 3 and 8, the flow bypass valve 74 comprises a cylindrical valve sleeve 126 carried within a valve body 128 and having an open inlet end adapted to receive the flow output of the gear pump 40 via the discharge conduit 50. A spring 130 reacts between the valve body 128 and a closed end wall 132 of the valve sleeve 126 to bias the valve sleeve in a normal direction toward the incoming hydraulic fluid. When the pressure of the fluid acting upon the end wall 132 is relatively low, the spring 130 positions the valve sleeve 126 with flow ports 134 therein in flow alignment with normal outlet ports 136 in the valve body 128. These outlet ports 136, as viewed in FIG. 3, connect the hydraulic fluid for continued passage through the discharge conduit 50 to the summing junction 52. However, when the pressure of the hydraulic fluid reaches a set relatively high threshold, the fluid pressure overcomes the bias force of the spring 130 and shifts the valve sleeve 126 to a position aligning auxiliary relief ports 138 therein with bypass outlet ports 140 in the valve body. Accordingly, when the pressure increases to a level indicative of an engine operating speed or condition such that the output of the gear pump 40 is no longer required, the valve sleeve 126 disconnects the output of the pump 40 from the summing junction 52 and reconnects this output through the bypass ports 140 and associated bypass conduit 142 to the recirculation conduit 42. This operation of the bypass valve 74 effectively unloads the gear pump 40, with the check valve 76 preventing undesired reverse fluid flow from the summing junction 52 to the bypass valve. Conveniently, if desired, the remote side of the valve sleeve 126 including the spring 130 may comprise a spring chamber connected to the recirculation conduit 42 or other suitable low pressure site via a vent 144 (FIG. 8) to prevent pressure build-up which could otherwise interfere with bypass valve operation.

The turbocharger system 10 of the present invention thus provides versatile control means for closely regulating the supply of hydraulic fluid to the three-wheel turbocharger 12 for purposes of supplying supplemental charge air to the engine 16. The main controller 72 comprises an appropriate computerized module or the like which can receive one and typically several input signals from sensordevices designed to monitor various operating parameters, such as speed, load, temperature, actual or desired air/fuel ratio and others. Based upon the overall input of information to the controller 72, appropriated command signals are delivered to the electrohydraulic control valve 62, solenoid unit 70, etc. to achieve the desired level of supplemental turbocharger operation. In this regard, the main controller 72 will normally include a schedule or matrix of desired engine operating conditions as a function of information inputted to the controller, and the controller will be appropriately programmed to operate the system to achieve the requisite degree of supplemental turbocharger driving.

In accordance with one further aspect of the invention, the center housing 28 (FIG. 4) of the turbocharger 12 is designed for facilitated assembly and further to permit occasional disassembly as may be required periodically for bearing service or the like. More particularly, for ease of manufacture, the nozzle bore 37 formed in the center housing 28 corresponds in size with the bores within which the journal bearings 24 are mounted. A somewhat larger bore 146 is formed in the turbine side end wall 148 of the center housing to permit relatively easy press fit installation of the nozzle 36 into the nozzle bore 37 prior to installation of the shaft 22 formed integrally with the turbine wheel 18. In this regard, a turbine wheel hub 150 is formed to seat appropriately within the turbine end wall 146, such that the hub 150 has a diametric size greater that the nozzle bore 37. The hydraulic turbine 34 can then be installed by press fitting onto the shaft 22, followed by installation of the compressor wheel and the journal and thrust bearings.

In accordance with further aspects of the invention, the entire turbocharger system 10 of the present invention in conveniently integrated into a compact and substantially unitary package for facilitated mounting onto the engine 16. Although this package arrangement is shown in FIGS. 1 and 2 with dual turbochargers 12, it will be understood that a single turbocharger configuration is also possible. Moreover, for ease of identification, the system components shown schematically in FIG. 3 are referred to herein in FIGS. 1 and 2 by common reference numerals.

Figure 9:
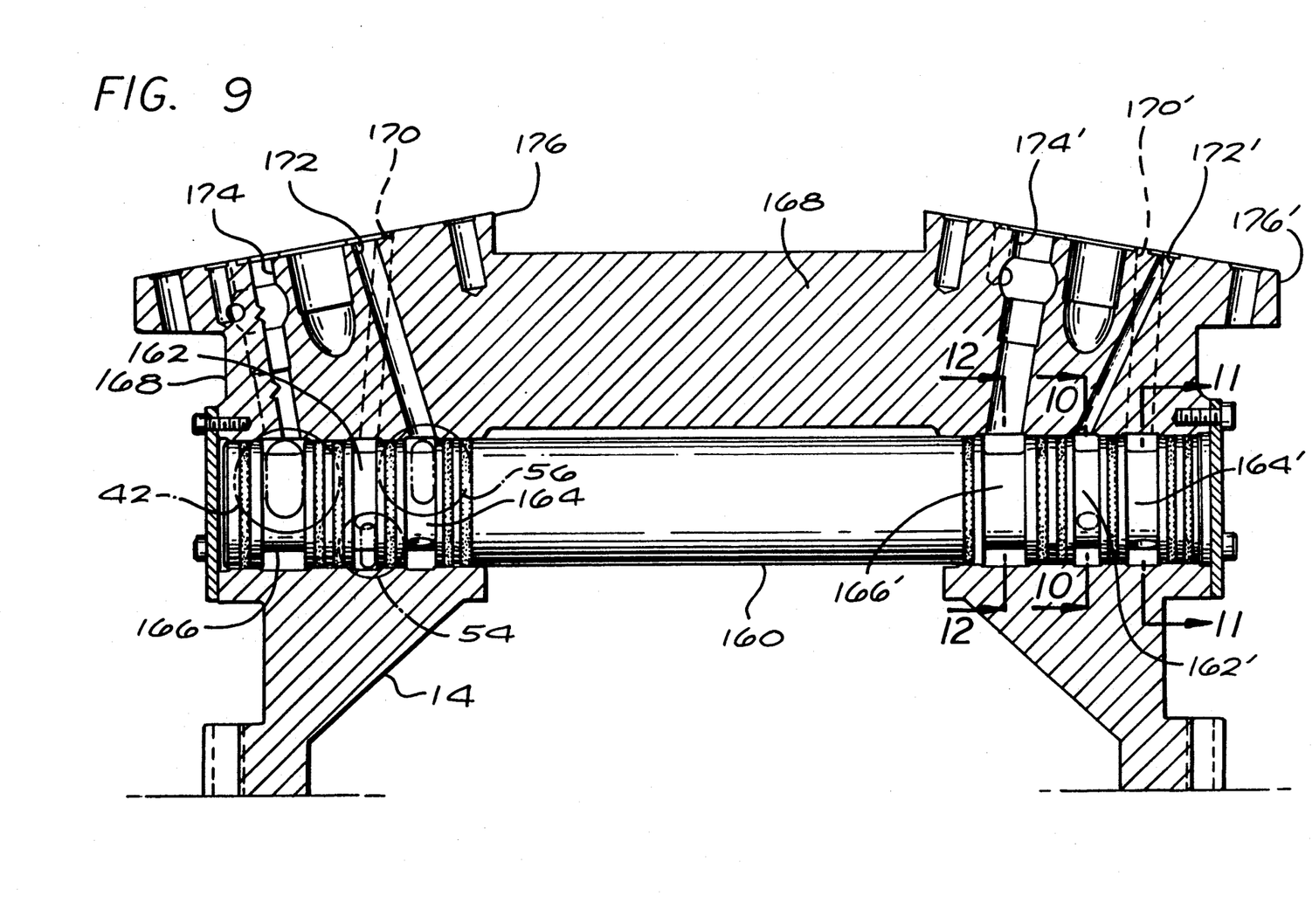
FIG. 9 is a fragmented vertical sectional view of a portion of the support frame taken generally on the line 9—9 of FIG. 2.
Figures 10, 11, 12:
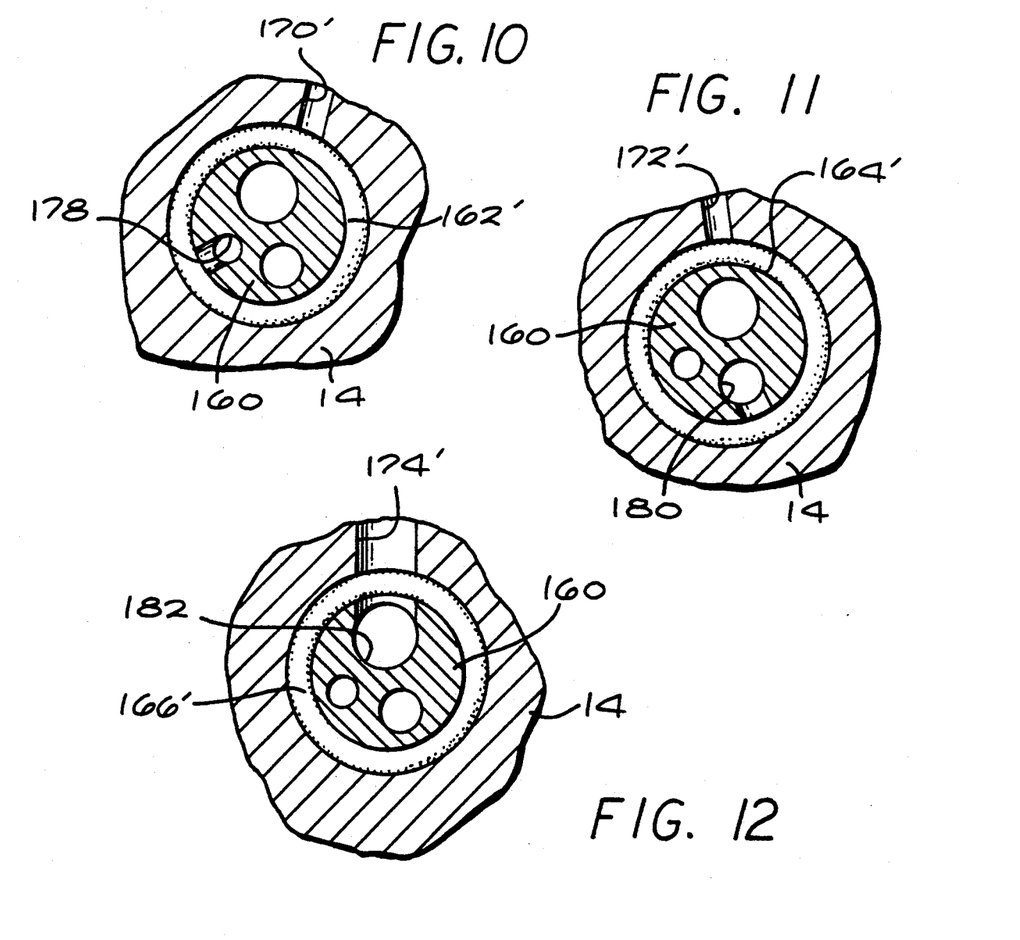
FIG. 10 is a fragmented vertical sectional view taken generally on the line 10—10 of FIG. 9.
FIG. 11 is a fragmented vertical sectional view taken generally on the line 11—11 of FIG. 9.
FIG. 12 is a fragmented vertical sectional view taken generally on the line 12—12 of FIG. 9.

More specifically, the support frame 14 carries the various control components and related valves for regulating supply of hydraulic fluid to and from the pair of turbochargers 12. Relatively rigid conduits defining the primary and secondary conduits 54 and 56, as well as the recirculation conduit 42 are connected from the control components to a manifold pipe 160 on the support frame 14. As viewed in FIG. 9, the manifold pipe 160 includes a trio of recessed lands 162, 164 and 166 at one end thereof, wherein these recessed lands define annular cavities for respective communication with the three conduits 54, 56 and 42. A header block portion 168 of the support frame 14 defines three flow channels 170, 172 and 174 in respective alignment with the land cavities 162, 164 and 166 for appropriately coupling the separate hydraulic flows to a pedestal 176 upon which the center housing 28 of one of the two turbochargers 12 is mounted. The turbocharger center housing in turn includes appropriate internal passages for circulation of the hydraulic flows to and from the hydraulic turbine 34, as appropriate.

The recessed lands 162, 164 and 166 each communicate with a respective one of three cross bores 178, 180 and 182 formed in the manifold pipe 160 (FIGS. 9-12). These cross bores 178, 180 and 182 provide separate paths for the hydraulic fluid to pass through the manifold pipe to communicate with counterpart recessed lands 162', 164' and 166' at the opposite end of the manifold pipe 160. This latter set of recessed lands 162', 164' and 166' are connected via corresponding header block channels 170', 172' and 174' to a second pedestal 176' adapted to support the center housing of the second turbocharger. Once again, the flow channels connect with additional passages within the center housing 28 to supply the hydraulic fluid to and from the hydraulic turbine 34 within the second turbocharger.

The hydraulic assist turbocharger system 10 of thus provides for close regulation of supplemental turbocharger driving in a single or multiple turbocharger system. The control scheme accommodates supplemental drive regulation in response to a wide range of engine operating parameters which may be substantially independent of engine speed and load for at least some conditions of operation.

A variety of modifications and improvements to the hydraulic assist turbocharger system will be apparent to those skilled in the art. Accordingly, no limitation on the invention by way of the foregoing description and accompanying drawings, except as set forth in the appended claims.

What is claimed is:

1. A turbocharger system for supplying charge air to a combustion engine, said system comprising:
    a pair of turbochargers each having a first turbine and compressor mounted on a common shaft for concurrent rotation, said first turbine being adapted to be rotatably driven by exhaust gases from the combustion engine to rotatably drive said compressor to produce charge air for supply to the engine, said turbocharger further including a second turbine mounted on said shaft, said second turbine comprising an hydraulic turbine for rotatably driving said common shaft to rotatably drive said compressor;
    pump means for producing a supply of hydraulic fluid under pressure, said pump means including first and second pump elements for generating parallel output flows of the hydraulic fluid under pressure;
    conduit means for delivering said hydraulic fluid under pressure to said second turbine to rotatably drive said second turbine, said conduit means including a summing junction for combining said parallel output flows into a single output flow of hydraulic fluid under pressure; and
    electrohydraulic control valve means for regulating passage of the hydraulic fluid through said conduit means to selectively control rotatable driving of said shaft by said second turbine in accordance with engine operating parameters;
    said conduit means further defining first and second nozzle orifices for passage of the hydraulic fluid under pressure into driving communication with said second turbine, said conduit means further including primary and secondary conduits connected in parallel from said summing junction respectively to said first and second nozzle orifices, said electrohydraulic control valve means including a selector valve mounted along said secondary conduit to close said secondary conduit during a selected engine operating condition.

2. The turbocharger system of claim 1 wherein selected engine operating condition comprises a start mode.

3. The turbocharger system of claim 1 wherein said first and second nozzle orifices each comprises a plurality of jet orifices.

4. A turbocharger system for supplying charge air to a combustion engine, said system comprising:
    a pair of turbochargers each having a first turbine and compressor mounted on a common shaft for concurrent rotation, said first turbine being adapted to be rotatably driven by exhaust gases from the combustion engine to rotatably drive said compressor to produce charge air for supply to the engine, said turbocharger further including a second turbine mounted on said shaft, said second turbine comprising an hydraulic turbine for rotatably driving said common shaft to rotatably drive said compressor;
    pump means for producing a supply of hydraulic fluid under pressure;
    conduit means for delivering said hydraulic fluid under pressure to said second turbine to rotatably drive said second turbine;
    electrohydraulic control valve means for regulating passage of the hydraulic fluid through said conduit means to selectively control rotatable driving of said shaft by said second turbine in accordance with engine operating parameters; and
    a common support frame having said pair of turbochargers and said control valve means and said pump means mounted thereon to define a substantially unitary package adapted for facilitated mounting onto the engine.

5. The turbocharger system of claim 4 wherein said conduit means includes a nozzle defining first and second nozzle orifices for passage of the hydraulic fluid under pressure into driving communication with said second turbine, said conduit means further including primary and secondary conduits connected in parallel from said summing junction respectively to said first and second nozzle orifices, said electrohydraulic control valve means including a selector valve mounted along said secondary conduit to close said secondary conduit during a selected engine operating condition.

6. The turbocharger system of claim 4 wherein said pump means includes first and second pump elements for generating parallel output flows of the hydraulic fluid under pressure, said conduit means including a summing junction for combining said parallel output flows into a single output flow of hydraulic fluid under pressure.

7. The turbocharger system of claim 6 wherein said first and second pump elements comprise a pair of positive displacement pumps adapted to produce said parallel output flows at a flow rate directly proportional to engine speed.

8. The turbocharger system of claim 6 wherein said electrohydraulic control valve means includes relief valve means for controllably relieving a selected portion of the hydraulic fluid from said summing junction.

9. A turbocharger system for supplying charge air to a combustion engine, said system comprising:
at least one turbocharger having a first turbine and compressor mounted on a common shaft for concurrent rotation, said first turbine being adapted to be rotatably driven by exhaust gases from the combustion engine to rotatably drive said compressor to produce charge air for supply to the engine, said turbocharger further including a second turbine mounted on said shaft, said second turbine comprising an hydraulic turbine for rotatably driving said shaft to rotatably drive said compressor;
pump means for producing a supply of hydraulic fluid under pressure, said pump means including first and second pump elements for generating parallel output flows of the hydraulic fluid under pressure;
conduit means for delivering said hydraulic fluid under pressure to said second turbine to rotatably drive said second turbine, said conduit means including a summing junction for combining said parallel output flows into a single output flow of hydraulic fluid under pressure; and
electrohydraulic control valve means for regulating passage of the hydraulic fluid through said conduit means to selectively control rotatable driving of said shaft by said second turbine in accordance with engine operating parameters, said electrohydraulic control valve means including relief valve means for controllably relieving a selected portion of the hydraulic fluid from said summing junction.

10. The turbocharger system of claim 9 wherein said electrohydraulic control valve means regulates passage of the hydraulic fluid through said conduit means substantially independent of engine speed and load for at least some engine operating conditions.

11. The turbocharger system of claim 9 wherein said at least one turbocharger comprises a pair of turbochargers each having said first and second turbines mounted on a common shaft with said compressor, and further including a common support frame having said pair of turbochargers and said control valve means and said pump means mounted thereon to define a substantially unitary package adapted for facilitated mounting onto the engine.

12. The turbocharger system of claim 9 wherein said relief valve means includes a valve member movable within a valve body to modulate relief flow of hydraulic fluid through a relief port formed in said valve body, and a pilot stage including means responsive to a command signal to modulate the position of said valve member, said electrohydraulic control valve means further including a controller responsive to engine operating conditions to generate and connect a selected command signal to said pilot stage.

13. The turbocharger system of claim 9 wherein said first and second pump elements comprise a pair of positive displacement pumps adapted to produce said parallel output flows at a flow rate directly proportional to engine speed.

14. The turbocharger system of claim 13 wherein said first and second pump elements are gear pumps.

15. The turbocharger system of claim 9 further including bypass valve means for relieving and unloading the outflow generated by said second pump element during selected operating conditions of the engine.

16. The turbocharger system of claim 15 wherein said first and second pump elements comprise positive displacement pumps adapted to be driven by the engine, said bypass valve means relieving and unloading the output flow of said second pump element when the output flow of said first pump element is sufficient to provide a selected driving input to said second turbine.

17. The turbocharger system of claim 9 wherein said conduit means including a nozzle defining first and second nozzle orifices for passage of the hydraulic fluid under pressure into driving communication with said second turbine, said electrohydraulic control valve means including means for preventing passage of the hydraulic fluid through said second nozzle orifice and for connecting the hydraulic fluid for passage only through said first nozzle orifice during a selected engine operating condition.

18. The turbocharger system of claim 17 wherein selected engine operating condition comprises a start mode.

19. The turbocharger system of claim 17 wherein said first and second nozzle orifices each comprise a plurality of jet orifices.

20. The turbocharger system of claim 9 wherein said conduit means includes a nozzle defining first and second nozzle orifices for passage of the hydraulic fluid under pressure into driving communication with said second turbine, said conduit means further including primary and secondary conduits connected in parallel from said summing junction respectively to said first and second nozzle orifices, said electrohydraulic control valve means including a selector valve mounted along said secondary conduit to close said secondary conduit during a selected engine operating condition.

21. The turbocharger system of claim 20 wherein selected engine operating condition comprises a start mode.

22. The turbocharger system of claim 20 wherein said first and second nozzle orifices each comprise a plurality of jet orifices.

* * * * *